US009509961B2

(12) United States Patent
Myers et al.

(10) Patent No.: US 9,509,961 B2
(45) Date of Patent: *Nov. 29, 2016

(54) MULTICHANNEL VIDEO CONTENT ANALYSIS SYSTEM USING VIDEO MULTIPLEXING

(71) Applicant: Avigilon Fortress Corporation, Vancouver (CA)

(72) Inventors: Gary Myers, Aldie, VA (US); Khanh Lam, San Jose, CA (US); Albert Au, San Jose, CA (US)

(73) Assignee: AVIGILON FORTRESS CORPORATION, Vancouver, BC (CA)

( * ) Notice: Subject to any disclaimer, the term of this patent is extended or adjusted under 35 U.S.C. 154(b) by 0 days.

This patent is subject to a terminal disclaimer.

(21) Appl. No.: 14/972,101

(22) Filed: Dec. 17, 2015

(65) Prior Publication Data

US 2016/0105646 A1 Apr. 14, 2016

Related U.S. Application Data

(63) Continuation of application No. 13/713,674, filed on Dec. 13, 2012, now Pat. No. 9,219,889.

(60) Provisional application No. 61/570,365, filed on Dec. 14, 2011.

(51) Int. Cl.
*H04N 7/18* (2006.01)
*G06K 9/00* (2006.01)
*G06K 9/78* (2006.01)

(52) U.S. Cl.
CPC .......... *H04N 7/181* (2013.01); *G06K 9/00577* (2013.01); *G06K 9/78* (2013.01)

(58) Field of Classification Search
CPC ....... H04N 5/2258; H04N 7/18; H04N 7/181
See application file for complete search history.

(56) References Cited

U.S. PATENT DOCUMENTS

| 6,956,600 | B1 | 10/2005 | Gaylord |
| 9,219,889 | B2 * | 12/2015 | Myers .................... H04N 7/181 |
| 2005/1000745 | | 1/2005 | McKay, III et al. |
| 2012/1022962 | | 9/2012 | Blumstein-Koren et al. |

OTHER PUBLICATIONS

Grain Media, "The Highest Integrated and Lowest BOM Cost Surveillance SOC for Apr. 8, 2016—Ch H.264 Hybrid DVR/NVR Solution", Technical Data Sheet.
SIGMA Designs, "SMP8650 Secure Media Processors", Technical Data Sheet.
Hisilicon, "Hi3531 H.264 Codec Processor", Technical Data Sheet.
Freescale Semiconductor, "i.MX53xD Applications Processors for Consumer Products", Technical Data Sheet, Rev. 4, Nov. 2011.

(Continued)

*Primary Examiner* — Huy T Nguyen
(74) *Attorney, Agent, or Firm* — Muir Patent Law, PLLC

(57) ABSTRACT

A system and method of analyzing a plurality of video signals received concurrently from a plurality of video cameras includes receiving a plurality of video signals captured from a plurality of respective video cameras, each video signal received over a respective camera channel; multiplexing the plurality of video signals to output a multiplexed video signal including frames from each of the captured video signals; performing automated video content analysis on the multiplexed video signal, including performing automated video content analysis for at least two of the camera channels.

20 Claims, 10 Drawing Sheets

A VCA-enabled NVR System Using Video Multiplexing

(56) References Cited

OTHER PUBLICATIONS

ST Microelectronics, "SPEAr1340—Dual-core Cortex A9 embedded MPU for multimedia", Technical Data Sheet.
Texas Instruments Inc., "Hybrid DVR reference designs available based on TI technology", Technical Data Sheet.
Nextchip, "4-Ch DVR Video Processor NVP1114MXA", Technical Data Sheet.
Nextchip, "4-Ch Video Decoder with Adaptive PAL/NTSC Comb Filter", Technical Data Sheet.
Samsung Electronics Co. Ltd., "Application Processor, Cortex As Series, Exynos 3110", Technical Data Sheet, printed Nov. 22, 2011.
Renesas Electronic Corp., "Application Processor", Technical Data Sheet, Jul. 2010.
Texas Instruments Inc., "TVP5158, TVP5157, TVP5156 Four-Channel NTSC/PAL Video Decoders With Independent Scalers, Noise Reduction, Auto Contrast, and Flexible Output Formatter for Security and Other Multi-Channel Video Applications", Data Manual. Jul. 2011.
Nexell, NXP 3200, Technical Data Sheet.
Texas Instruments Inc., "TMS320DM816x DaVinci Digital Media Processors". Technical Data Sheet, Aug. 2011.

\* cited by examiner

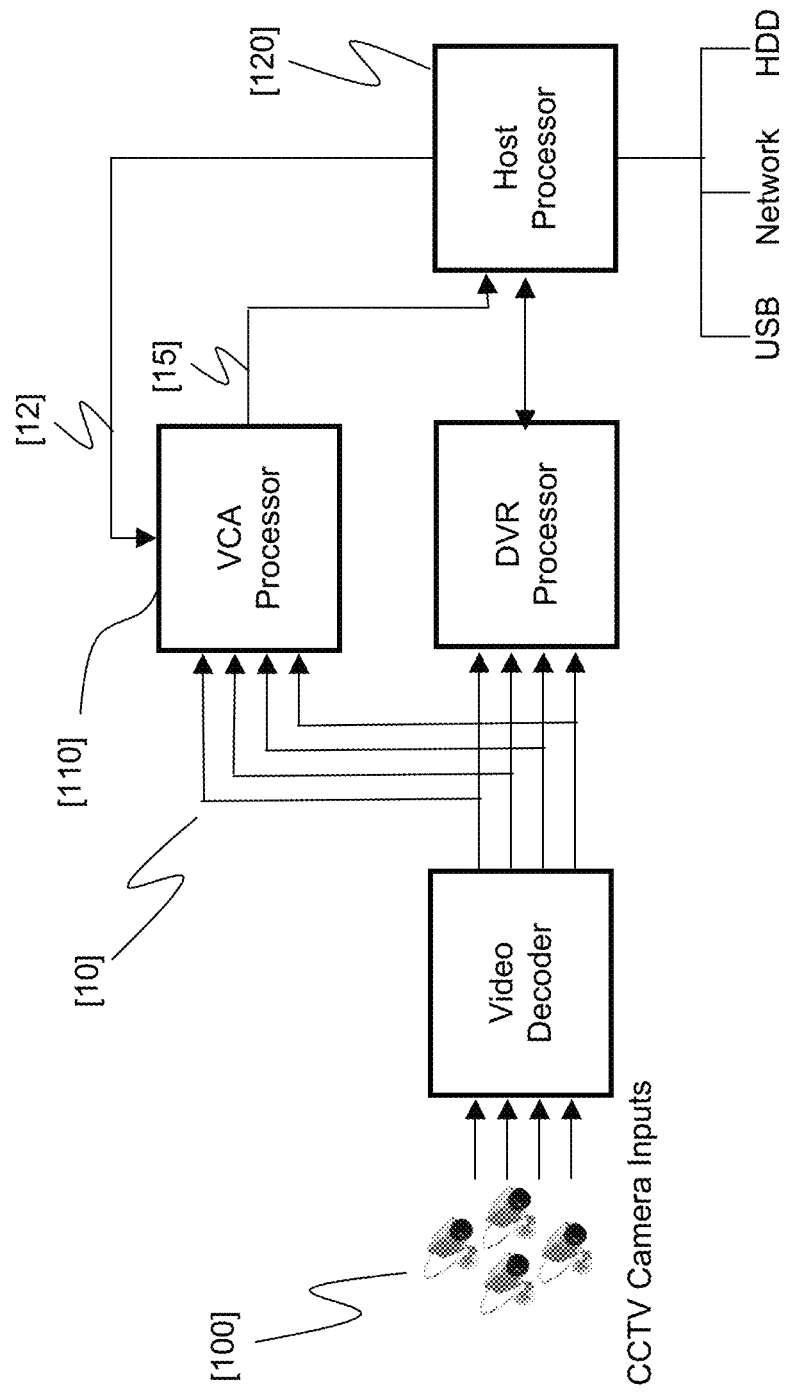
Figure 1: A Typical VCA-enabled DVR System
(Prior Art)

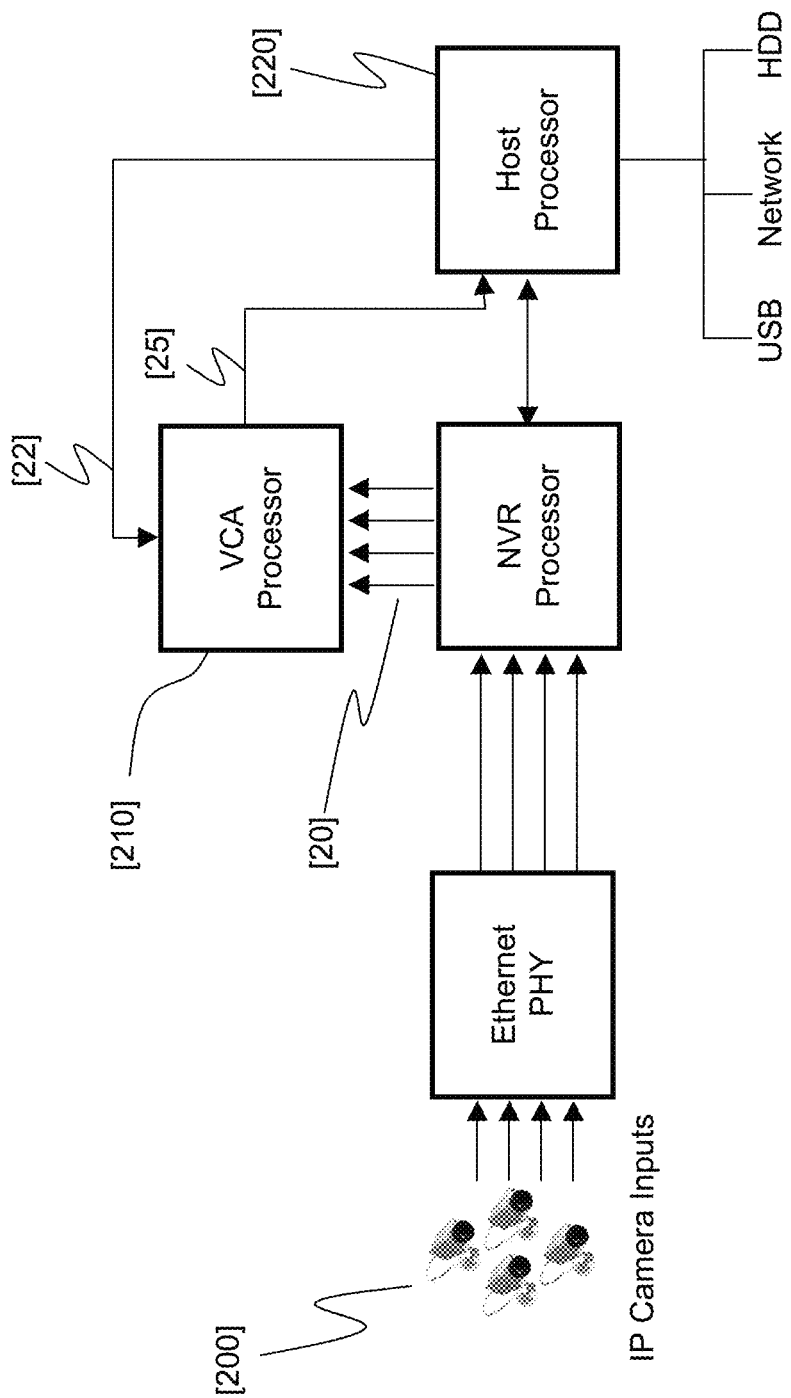
Figure 2: A Typical VCA-enabled NVR System
(Prior Art)

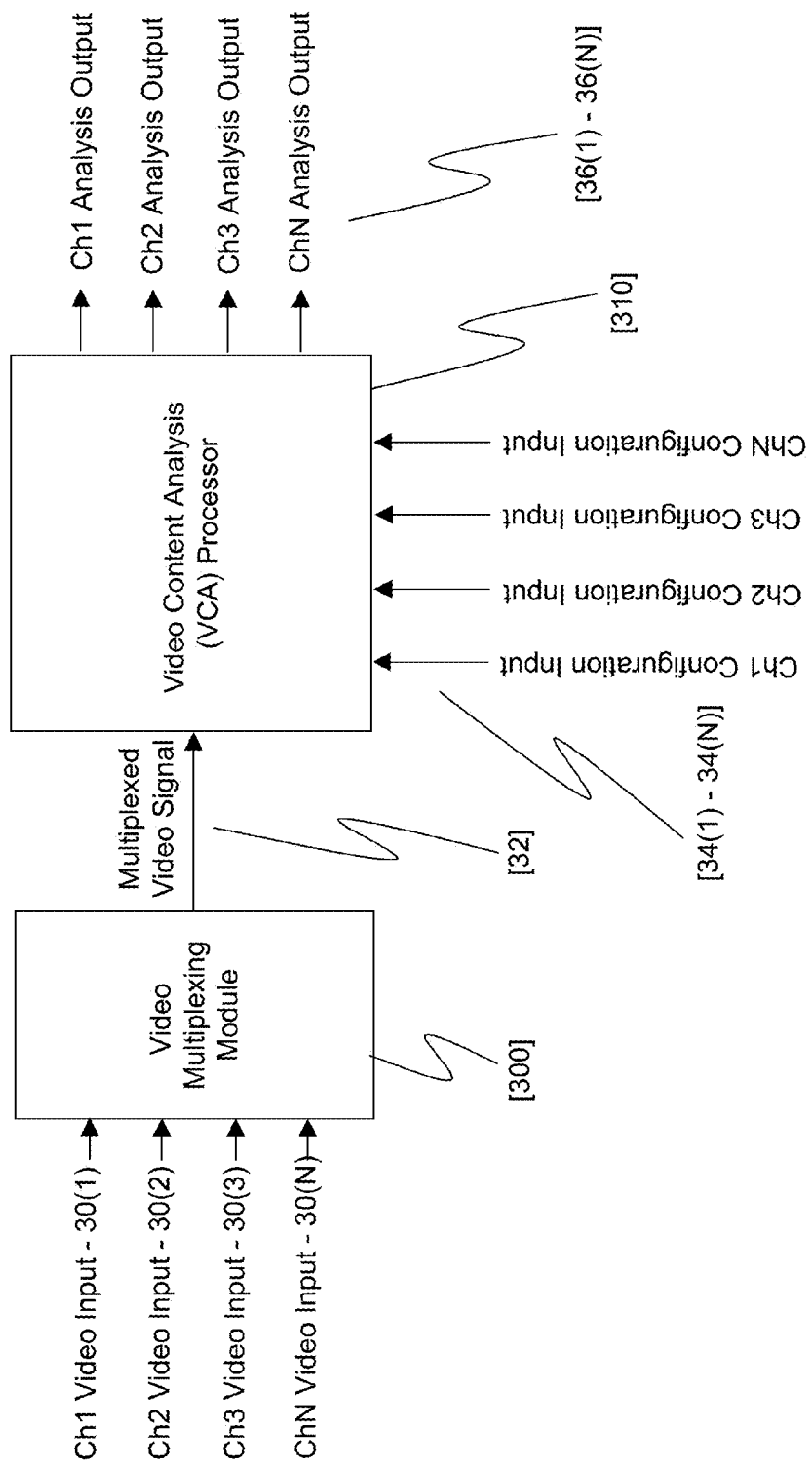
Figure 3: A Multichannel Video Content Analysis System Using Video Multiplexing

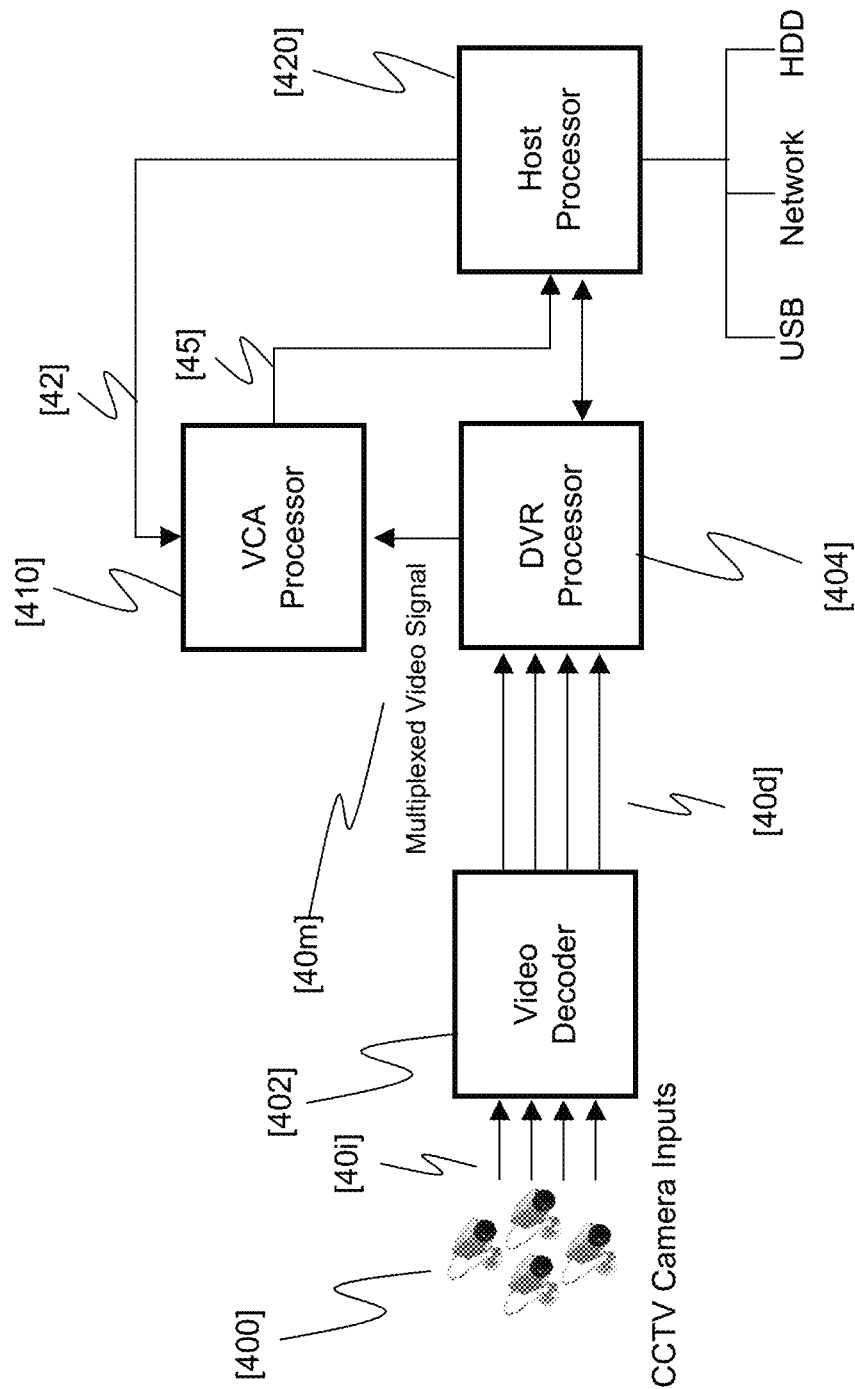
Figure 4: A VCA-enabled DVR System Using Video Multiplexing

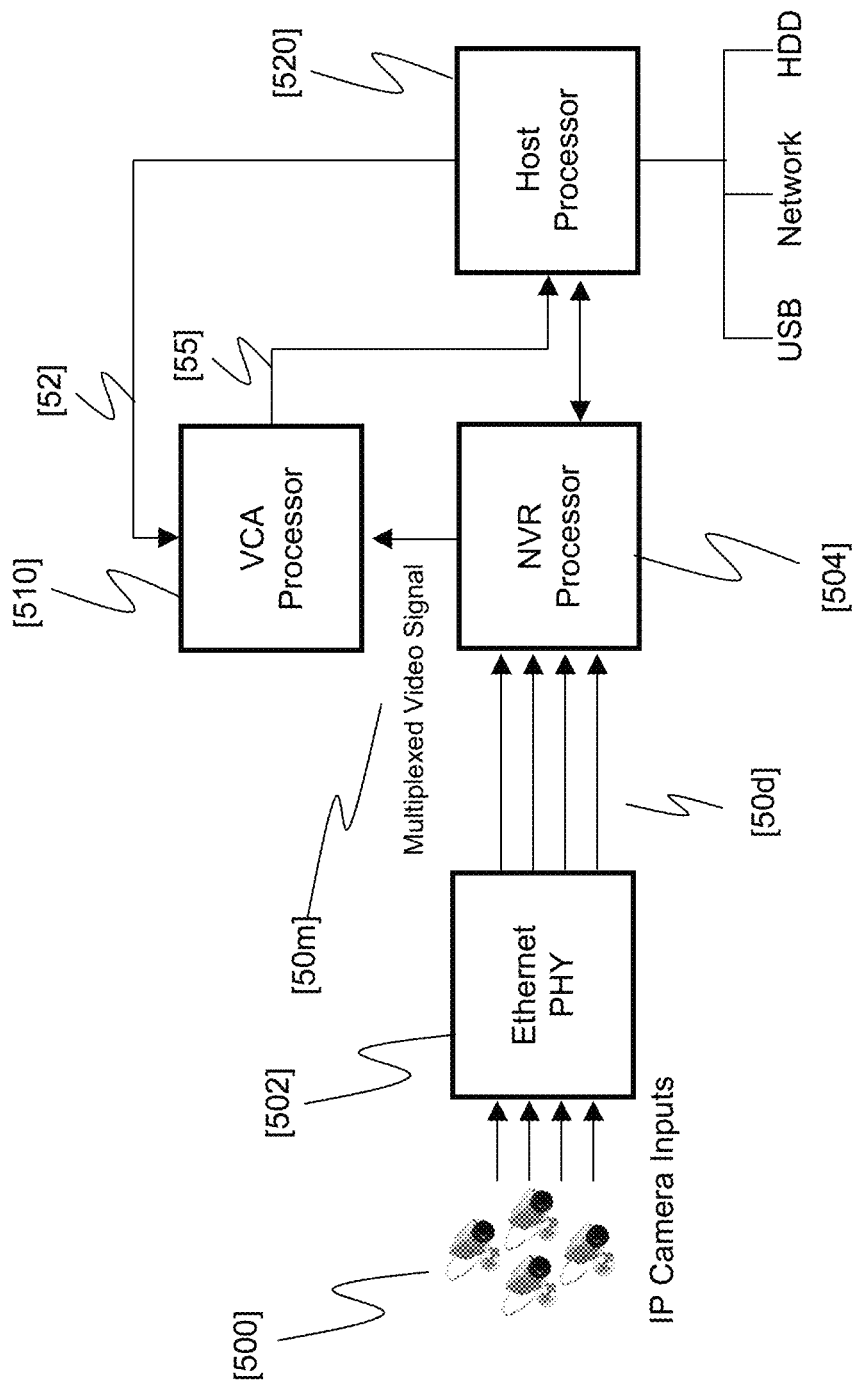
Figure 5: A VCA-enabled NVR System Using Video Multiplexing

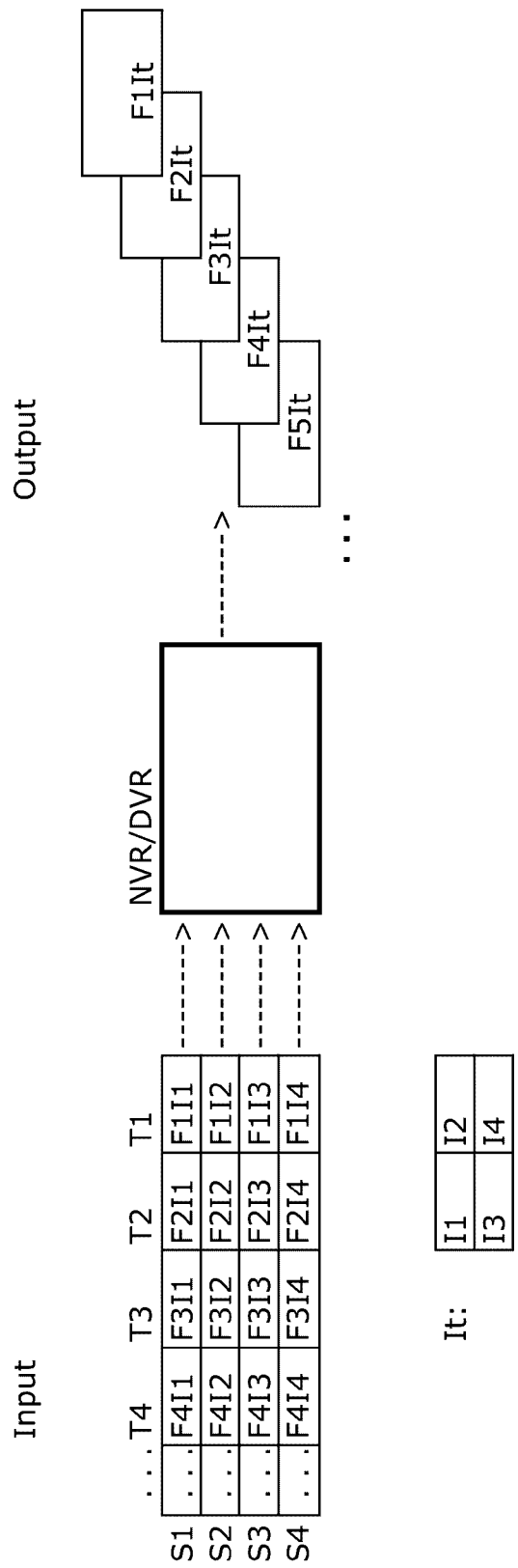
Figure 6A: Multiplexing Method 1

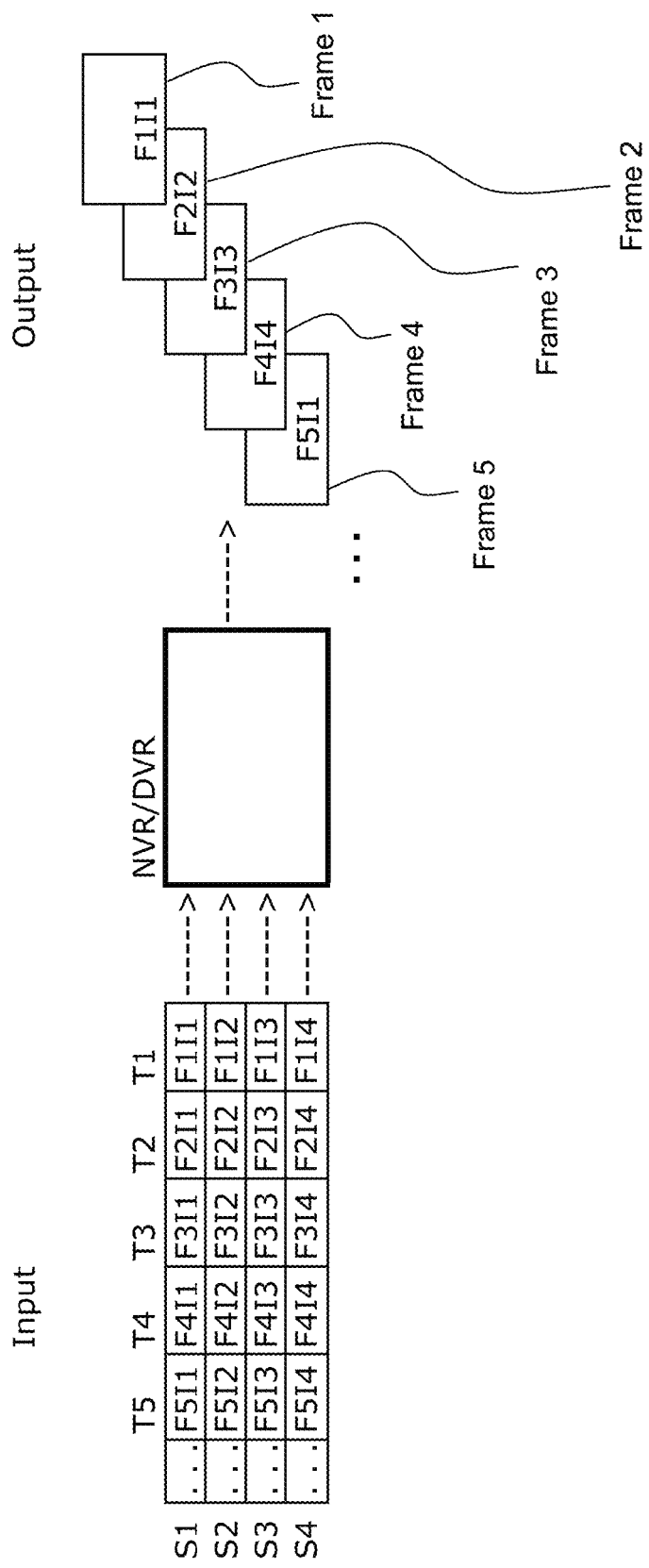
Figure 6B: Multiplexing Method 2

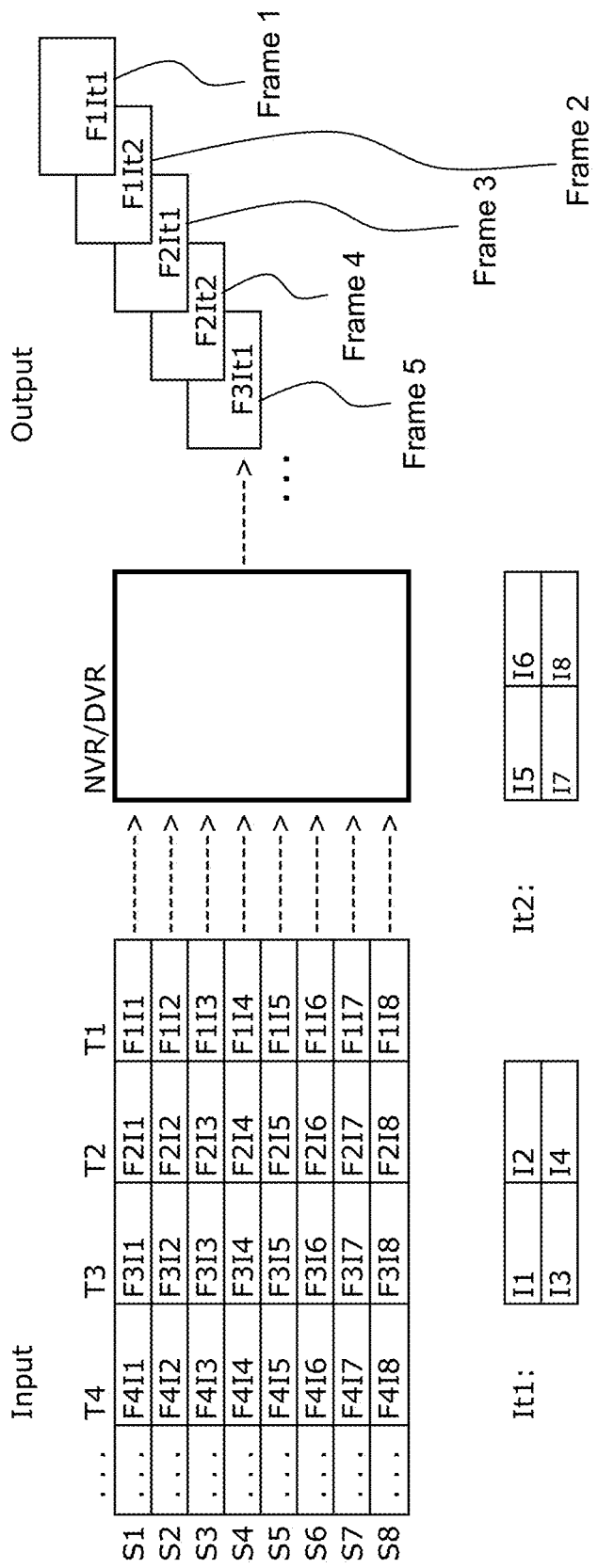

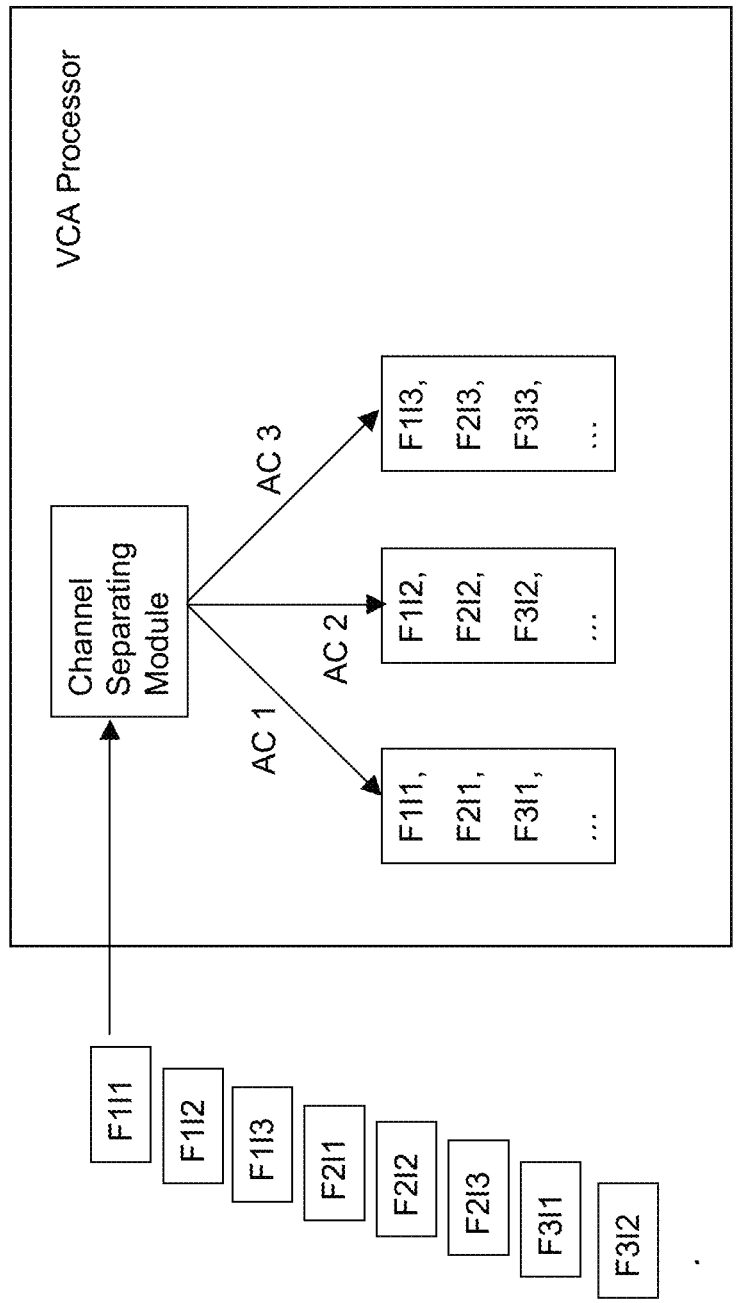

Figure 7B: Spatial Multiplexing Analysis

Simultaneous Analysis

| I1 | I2 |
|----|----|
| I3 | I4 |

Image 1 Analysis

| I1 | I2 |
|----|----|
| I3 | I4 |

Image 2 Analysis

| I1 | I2 |
|----|----|
| I3 | I4 |

Image 3 Analysis

| I1 | I2 |
|----|----|
| I3 | I4 |

Image 4 Analysis

| I1 | I2 |
|----|----|
| I3 | I4 |

MULTICHANNEL VIDEO CONTENT ANALYSIS SYSTEM USING VIDEO MULTIPLEXING

CROSS-REFERENCE TO RELATED APPLICATION

This application is a continuation application of U.S. patent application Ser. No. 13/713,674, filed Dec. 13, 2012, now U.S. Pat. No. 9,219,889, which claims the benefit of priority to U.S. Provisional Patent Application No. 61/570,365, filed Dec. 14, 2011, the contents of each of which are incorporated herein by reference in their entirety.

BACKGROUND

1. Field

This disclosure relates to a system for multichannel video content analysis using video multiplexing.

2. Background

Video content analysis (VCA) has become a very important function in a variety of fields, such as retail, health care and security. Traditionally, video surveillance equipment, such as the camera, digital video recorder (DVR) and network video recorder (NVR) have been passive devices. Adding VCA capability to this video equipment facilitates detection of certain features in a video image (e.g., event detection). For example, a VCA-enabled surveillance system can actively monitor a scene to detect an intruder or abandonment of an object, or perform facial recognition, license plate recognition, behavior analysis, object tracking, and intelligent search. In embedded system applications like the DVR and NVR, VCA capability is typically supported by a coprocessor or a VCA processor.

FIG. 1 depicts a system diagram of a typical VCA-enabled DVR, and FIG. 2 depicts a system diagram of a typical VCA-enabled NVR.

A surveillance system may include a plurality of camera devices connected to a DVR or an NVR device. The camera devices may be, for example, an analog video camera (100) or digital camera (200). For example, the analog video camera 100 may output video in CCTV (closed circuit TV) format. The digital camera 200 may be a IP based camera. The ability to actively monitor a multitude of camera scenes at the same time is often paramount to providing optimum security. Therefore, it is very important for VCA-enabled equipments to be able to analyze multiple video channels simultaneously.

Currently in existence are various methods and systems for analyzing multiple video channels. A typical VCA-enabled system, as depicted in FIG. 1 and FIG. 2, includes a VCA processor (110, 210) that receives multiple channel video inputs (10, 20) via a plurality of input lines having respective connectors, and receives configuration inputs (12, 22) and provides the corresponding analysis outputs (15, 25) to a host processor (120, 220). This type of implementation has several disadvantages particularly for embedded system applications. For example, it may be difficult to find or expensive to use a VCA processor chip that includes a large number of video inputs (e.g., a large number of physical input ports for a plurality of connectors such as video cables). For instance, to support VCA on all channels of a 16-channel DVR would require a VCA processor (110, 210) that can support 16 channel video inputs. Commercially available off-the-shelf processor chips either do not support such a large number of video inputs or are unduly expensive. In order to support VCA on such a large number of video inputs, a custom design processor chip may be implemented, but such custom design adds to the cost of the VCA processor. In addition, providing a separate video input for each video to be analyzed (e.g., 16 video inputs, each video input comprising a connector having multiple pins for transmitting a video associated with an individual camera) requires a significant amount of input terminals to the VCA processor, increasing cost further. Furthermore, the inability to use commercially available off-the-shelf processor chip makes the added manufacturing costs for the VCA function cost prohibitive for many applications.

SUMMARY

The disclosed embodiments provide a method and system for analyzing a multitude of video sources using video multiplexing. In certain embodiments, a single commercial off-the-shelf type video processor may be used to analyze a plurality of video signals (although the invention is not limited to use of a single video processor or commercial off-the-shelf video processors). For example, a video processor with one video input (e.g., one port for a video connector) may be used to perform content analysis of video from 4, 8 or 16 cameras. The analysis may be used, for example, in a video surveillance system, and may use a tiling technique among other multiplexing techniques.

BRIEF DESCRIPTION OF THE DRAWINGS

Example embodiments will be more clearly understood from the following detailed description taken in conjunction with the accompanying drawings. The figures represent non-limiting example embodiments as described herein.

FIG. 1 is a block diagram illustrating a typical video content analysis (VCA)-enabled digital video recorder (DVR) system;

FIG. 2 is a block diagram illustrating a typical VCA-enabled network video recorder (NVR) system;

FIG. 3 is a block diagram illustrating a multichannel video content analysis system using video multiplexing, according to certain exemplary embodiments;

FIG. 4 is a block diagram illustrating a VCA-enabled DVR system using video multiplexing, according to certain exemplary embodiments;

FIG. 5 is a block diagram illustrating a VCA-enabled NVR system using video multiplexing, according to certain exemplary embodiments;

FIG. 6A is a block diagram illustrating method of multiplexing video signals, according to certain exemplary embodiments;

FIG. 6B is a block diagram illustrating a method of multiplexing video signals, according to other exemplary embodiments;

FIG. 6C is a block diagram illustrating a method of multiplexing video signals, according to other exemplary embodiments;

FIG. 7A is a block diagram illustrating a method of analyzing time-multiplexed video data, according to certain exemplary embodiments; and FIG. 7B is a block diagram illustrating a method of analyzing spatially-multiplexed video data, according to certain exemplary embodiments.

DETAILED DESCRIPTION

The present disclosure will be described more fully hereinafter with reference to the accompanying drawings, in which various embodiments are shown. The invention may, however, be embodied in many different forms and should not be construed as limited to the embodiments set forth herein. In the drawings, like numbers refer to like elements throughout.

It will be understood that when an element is referred to as being "connected" or "coupled" to or "in communication with" another element, it can be directly connected or coupled to or in communication with the other element or intervening elements may be present. In contrast, when an element is referred to as being "directly connected" or "directly coupled" or "in direct communication with" another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. Unless indicated otherwise, these terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

This disclosure includes particular terminology and descriptions that relate to video surveillance and analysis. The descriptions are intended to provide a framework for certain terms and concepts, and are not intended to limit the scope of this disclosure unless explicitly stated.

FIG. 3 depicts a multichannel video content analysis (VCA) system that uses video multiplexing, such as tiling. As shown in FIG. 3, a plurality of video signals 30(1)-30(N) including frames of video data are received for respective camera channels Ch1-ChN by a video multiplexing module 300. A camera channel, as used to herein, refers to a channel over which video data output from a single camera, prior to being multiplexed or combined with video data from other cameras, is transmitted. As described further below, in certain embodiments, the video multiplexing module 300 may include a digital video recorder (DVR) processor, or a network video recorder (NVR) processor, and/or may include one or more other component parts. As shown in FIG. 3, the video multiplexing module 300 receives a plurality of inputs (e.g., video signals 30(1)-30(N) received from separate camera channels Ch1-ChN), and converts those inputs to a multiplexed video signal 32. For example, as described further below, each input may be received simultaneously as a series of video frames, and the video multiplexing module may reorganize the frames and output the multiplexed video signal 32 as a set of reorganized frames that have been spatially multiplexed (i.e., "tiled"), time division multiplexed, or both spatially and time division multiplexed.

As discussed herein, a frame may include a particular image captured by one or more image sources. A set of consecutive frames from a same one or more image sources makes up a video. If the one or more image sources is a single image source, such a single camera, the frame comprises a single-camera frame and includes image data from a single camera channel. If the one or more image sources is a plurality of images sources, such as a plurality of cameras, the frame may comprise a tiled frame that includes image data from a plurality of camera channels. A frame, whether resulting from a single camera or resulting from a plurality of cameras and organized in a tiled manner, may correspond to data captured at a particular discrete moment in time.

Also as discussed herein, a frame of a video that includes a plurality of camera images may be referred to herein as a tiled frame. The plurality of camera images for each frame may be a plurality of images received from a plurality of respective cameras (e.g., a plurality of camera channels) at the same time. The camera images may be tiled to have different spatial orientations when viewed as a tiled image. For example, a tiled frame that includes 16 images from 16 respective cameras may include the images arranged in 4 rows and 4 columns, or in other configurations such that the aspect ratio of each channel view is maintained.

The reorganized frames of the multiplexed video signal are then input to a video content analysis (VCA) processor, which may additionally receive separate configuration inputs 34(1)-34(N) for each video signal 30(1)-30(N). The VCA processor may then perform content analysis on the multiplexed video signal 32 representing the original video signals 30(1)-30(N), based on the configuration inputs. Content analysis refers to analysis of one or more frames in an analysis channel to determine objects and/or attributes of a video stream for that analysis channel. Content analysis provides analytics data. The objects can be physical objects in the video. The attributes can include physical attributes, for example color, size, texture, etc., or temporal attributes, for example direction of motion, speed, an object appearing or disappearing, etc. Exemplary objects and attributes are described in U.S. Pat. No. 7,932,923, to Lipton et al., issued on Apr. 26, 2011 ("the '923 patent"), which is incorporated herein by reference in its entirety.

A single analysis channel may perform content analysis on all or part of a set of frames associated with a same one or more image sources. The analysis channel may be implemented by a VCA processor using one or more algorithms to perform content analysis on selected data. For example, one analysis channel may perform content analysis on images captured by and received from a particular camera (e.g., a first camera channel). A second analysis channel may perform content analysis on images captured by and received from a different camera (e.g., a second camera channel). A third analysis channel may perform content analysis on tiled frames including tiled images, each image received from a different one of a plurality of cameras (e.g., via first through fourth camera channels). Different analysis channels may perform similar content analysis but be configured differently, due, for example, to calibration settings (e.g., to determine sizes of objects), contrast settings, and environmental settings (e.g., whether a camera is indoors or outdoors). For example, some of the same algorithms may be used in performing content analysis for different content analysis channels, but the calibration settings, contrast settings and/or environmental settings may alter which data is processed by the algorithms or the manner in which the data is processed by the algorithms.

As a result of content analysis, the VCA processor then outputs analytics data for the video data associated with the camera channels Ch1-ChN. Particular sets of analytics data may be output for different analysis channels. For example, analytics data for the video data for camera channel Ch1 may be created by a first set of algorithms that comprise a first analysis channel, analytics data for the video data for camera channel Ch2 may be created by a second set of algorithms that comprise a second analysis channel, etc. In addition, or alternatively, analytics data for tiled images may be created by a set of algorithms that comprise an analysis channel that performs analytics on tiled frames. The outputs 36(1)-36(N) may be transmitted to a host processor for further processing and analysis, such as event detection and action triggering.

For example, events relating to scenes and objects are detected by applying rules, also described as event discriminators, to analytics data. For example, a rule can be set to determine if an object appears at a particular location within a video image. When the object appears at that location, the event is detected. Events can be used to generate reports or trigger actions, for example alarms or operation of a mechanical device (e.g., close a garage door). Additional examples of rules and events, as well as event detection outputs and actions, are described in the '923 patent.

FIG. 4 depicts a system diagram of a VCA-enabled DVR system using video multiplexing, according to one embodiment. As shown in FIG. 4, in one embodiment, the system includes a plurality of video cameras 400, video decoder 402, DVR processor 404, VCA processor 410, and host processor 420.

Video cameras 400 may include, for example, standard cameras used for video surveillance or other purposes. For example, in one embodiment, video cameras 400 are CCTV cameras installed at a particular facility. The video cameras output video signals 40$i$ over different camera channels, which may be different physical wired or wireless channels, to video decoder 402. Each video signal may include a plurality of video frames. In one embodiment, each video signal is an analog signal. In one embodiment, the cameras may produce video having, for example, 30 frames per second (fps). However, video having other frames per second may be used as well.

Video decoder 402 receives the different video signals 40$i$ from the plurality of video cameras 400, decodes the signals, and outputs decoded video signals 40$d$ (also referred to herein as video streams) to DVR processor 404. In certain embodiments, video decoder 402 includes one or more chips or circuitry for implementing a decoder or codec. Video decoder 402 may be a known video decoder such as, for example, a Techwell TW2864, Nextchip NPV1004, or TI TVP5158 decoder. Other decoders may be used. The decoders may perform operations such as analog-to-digital conversion, noise reduction, contrast adjustment, formatting, etc.

DVR processor 404, which may be part of a multiplexing module that includes a multiplexer, receives the decoded video signals 40$d$, processes the signals, and outputs a multiplexed video signal 40$m$. Specific methods and types of multiplexing are described further below. DVR processor 404 may include one or more chips or circuitry for implementing a video multiplexer (MUX) and/or controller used to perform multiplexing and other operations. Examples of such video MUX/controllers include the Techwell TW2880 and Nextchip NVP1114MXA devices. Other devices may be used to implement DVR processor 404. In one embodiment, DVR processor 404 includes a plurality of video inputs (e.g., 4, 8, 12, etc.), each video input including hardware and/or software compliant with a video standard (e.g., each video input may include a connection for an 8 or 10 bit bus and may be configured to receive standard PAL or NTSC video associated with a single camera). In one embodiment DVR processor may include a CVBS SPOT output.

Host processor 420 may be a known processor configured and programmed to send and receive data and instructions to and from DVR processor 404 and VCA processor 410, and to output data and instructions, for example, to an output device such as a USB-enabled device (i.e., a video screen, printer, etc.), a network, and/or a hard disk drive or other storage medium.

In certain embodiments, one or more of video decoder 402, DVR processor 404, and host processor 420 are combined as a single device. For example, one exemplary combined video MUX/controller and video codec is the SoftLogic SOLO6110. Exemplary combined MUX/controller, video codec, and host processor devices, sometimes referred to as "DVR on a chip" devices include the TI Netra DM8168, Hisilicon Hi3531, and Grain Media GM8181 devices.

VCA processor 410, which may be part of an analysis module, receives the multiplexed video signal 40$m$ and also may receive configuration information 42 for the different video cameras 400 and video signals output from the video cameras 400. Known VCA processors may be used, such as the STMicroelectronics SPEAr1340, Freescale i.MX53xD, Samsung Exynos 3110, Sigma Design SMP8650, Renesas EMMA, Corelogic CLM7700, or Nexell NXP3200 devices. If a separate DVR processor 404 and host processor 420 are used, the VCA processor 410 may receive the multiplexed video signal 40$m$ from the DVR processor 404, and may receive the configuration information from the host processor 420. If a DVR on a chip type device is used, the VCA processor 410 may receive the multiplexed video signal 40$m$ and the configuration information from the DVR on a chip device. In one embodiment, the multiplexed video signal 40$m$ is received using a single video input (e.g., a single cable having a connector connected to an input port).

The VCA processor 410 then performs video content analysis on the received multiplexed video signal, and may perform the content analysis using the configuration information. The content analysis may include, for example, detecting objects and attributes of the video frames. In certain embodiments, a single processor performs the video content analysis. The processor may process data, for example, at a frequency of 27 MHz. Alternatively, a different processing frequency may be used, and/or a plurality of processors may perform video content analysis.

The VCA processor 410 may perform content analysis using one or more analysis channels. For example, if time division multiplexing is used, frames for each channel Ch1-ChN (i.e., each camera) may be received separately at VCA processor 410. VCA processor 410 can then analyze the frames by associating sets of received frames with a particular camera channel (one of Ch1-ChN), and performing analytics on the separate sets of frames. If spatial multiplexing (i.e., "tiling") is used, frames for a plurality of channels Ch1-ChN may be received as tiled frames at VCA processor 410, such that images from the plurality of channels are received at the same time. The VCA processor 410 can then analyze the tiled frames as a single analysis channel, or can perform cropping and then analyze different tiles of the tiled frames separately from each other as separate analysis channels. In addition, as described further below, a combination of time division multiplexing and tiling could be used as well.

After analytics data is obtained, the analytics data, such as object and attribute data are output as output data 45 to host processor 420 (or to the DVR on a chip device), which further processes the results (e.g., by performing event detection and/or action triggering), and may output resulting data or commands to control output devices, and/or transmit the results to another device or system. For example, the results can be used to trigger an alarm that informs a technician or a computer system of a possible security breach.

FIG. 5 depicts a system diagram of a VCA-enabled NVR system using a video multiplexing technique, according to one embodiment. As shown in FIG. 5, in one embodiment, the system includes a plurality of video cameras 500, an Ethernet physical layer device 502, DVR processor 504, VCA processor 510, and host processor 520.

Video cameras 500 may include standard cameras used for video surveillance or other purposes. For example, in one embodiment, video cameras 500 are Ethernet-enabled cameras installed at a particular facility. The video cameras may include hardware and software for processing received video data, and may format the received video data into streams 50*d* each including a plurality of frames of digital video data. Different cameras output streams over different camera channels. The video cameras may each include an Ethernet physical layer device 502 used to format the received video data into streams. Alternatively, the video cameras may all share a common Ethernet physical layer device 502. The digital video data can then be transmitted, through wired or wireless media, to an NVR processor 504. In one embodiment, the cameras may produce video streams having, for example, 30 frames per second (fps). However, streams having other frames per second may be used as well.

NVR processor 504 receives the video streams 50*d*, processes the streams, and outputs a multiplexed video signal 50*m*. The video streams 50*d* may be received, for example, over different respective video inputs. Specific methods and types of multiplexing are described further below. NVR processor 504 may include one or more chips or circuitry for implementing a video multiplexer (MUX) and/or controller used to perform multiplexing operations. Examples of such video MUX/controllers include the Techwell TW2880 and Nextchip NVP1114MXA devices. Other devices may be used to implement NVR processor 404.

Host processor 520 may be a known processor configured and programmed to send and receive data and instructions to and from NVR processor 504 and VCA processor 510, and to output data and instructions, for example, to an output device such as a USB-enabled device (i.e., a video screen, printer, etc.), a network, and/or a hard disk drive or other storage medium.

In one embodiment, one or more of the Ethernet device 502, NVR processor 504, and host processor 520 may be combined in a single device. For example, a video MUX/controller, video decoder or codec, and/or host processor may be combined into a single device. Exemplary combined MUX/controller, Ethernet physical layer device, and host processor devices may function as "NVR on a chip" devices and may include the TI Netra DM8168, Hisilicon Hi3531, and Grain Media GM8181 devices.

VCA processor 510 receives the multiplexed video signal 50*m* and also may receive configuration information 52 for the different video cameras 500 and signals output from the video cameras 500. Known VCA processors may be used, such as the STMicroelectronics SPEAr1340, Freescale i.MX53xD, Samsung Exynos 3110, Sigma Design SMP8650, Renesas EMMA, Corelogic CLM7700, and Nexell NXP3200 devices. If a separate NVR processor 504 and host processor 520 are used, the VCA processor 510 may receive the multiplexed video signal 50*m* from the NVR processor 504, and may receive the configuration information from the host processor 520. If an NVR on a chip type device is used, the VCA processor 510 may receive the multiplexed video signal 50*m* and the configuration information from the NVR on a chip device. In one embodiment, the VCA processor 510 receives the multiplexed video signal 50*m* via a single video input.

The VCA processor 510 then performs video content analysis on the received multiplexed video signal, and may perform the content analysis using the configuration information. The content analysis may include, for example, detecting objects and attributes of the video frames. In certain embodiments, a single processor performs the video content analysis. Alternatively, a plurality of processors may perform video content analysis. The VCA processor 510 may perform content analysis using one or more analysis channels. For example, if time division multiplexing is used, frames for each channel Ch1-ChN (i.e., each camera) may be received separately at VCA processor 510. VCA processor 510 can then analyze the frames by associating sets of received frames with a particular camera channel (one of Ch1-ChN), and performing analytics on the separate sets of frames. If spatial multiplexing (i.e., "tiling") is used, frames for a plurality of channels Ch1-ChN may be received as tiled frames at VCA processor 510, such that images from the plurality of channels are received at the same time. The VCA processor 510 can then analyze the tiled frames as a single analysis channel, or can perform cropping and then analyze different tiles of the tiled frames separately from each other as separate analysis channels. In addition, as described further below, a combination of time division multiplexing and tiling could be used as well.

After analytics data is obtained, the analytics data, such as object and attribute data are output as output data 55 to host processor 520 (or to the NVR on a chip device), which further processes the results (e.g., by performing event detection and/or action triggering), and may output resulting data or commands to control output devices and/or transmit the results to another device or system. For example, the results can be used to trigger an alarm that informs a technician or a computer system of a possible security breach.

FIGS. 6A-6C illustrate exemplary multiplexing methods used by the DVR/NVR processor or a DVR/NVR on a chip device, according to certain embodiments. The multiplexing methods receive video data/streams in parallel, and output multiplexed video data, as described below. As described in the embodiments above, according to certain embodiments, the input is received at a multiplexing device, such as a DVR processor, NVR processor, DVR on a chip device, or NVR on a chip device. The input may be processed, for example, using time division multiplexing, spatial multiplexing ("tiling"), or a combination thereof. In one embodiment, the output multiplexed video data is output to a VCA processor.

One embodiment, as shown in FIG. 6A, a plurality of digital video streams are received as input. The streams include a first stream S1 from a first camera channel, including a plurality of frames of video data from a first camera (F1I1 corresponding to time T1, F2I1 corresponding to time T2, F3I1 corresponding to time T3, and F4I1 corresponding to time T4, etc.), a second stream S2 from a second camera channel, including a plurality of frames of video data from a second camera (F1I2 corresponding to time T1, F2I2 corresponding to time T2, F3I2 corresponding to time T3, and F4I2 corresponding to time T4, etc.), a third stream S3 from a third camera channel, including a plurality of frames of video data from a third camera (F1I3 corresponding to time T1, F2I3 corresponding to time T2, F3I3 corresponding to time T3, and F4I4 corresponding to time T4, etc.), and a fourth stream S4 from a fourth camera channel, including a plurality of frames of video data from a fourth camera (F1I4 corresponding to time T1, F2I4 corresponding to time T2, F3I4 corresponding to time T3, and F4I4 corresponding to time T4, etc.). Additional streams from additional cameras may also be received.

In certain embodiments, the streams may be received, as described above, at a DVR or NVR processor, or at a DVR on a chip device or NVR on a chip device, and the streams may be transmitted from an Ethernet device (for an NVR system), or a decoder (for a DVR system). In one embodiment, corresponding frames for each of the first, second, third, and fourth streams are received at the same time (i.e., the first frames are received at T1, second frames are received at T2, etc.). The images associated with each stream may be stored in a buffer, such as a FIFO buffer or memory.

As shown in FIG. 6A, in one embodiment, the input streams are converted to tiled output video data by spatial multiplexing. For example, for each set of frames received at a particular time period, the images for those frames associated with respective cameras are tiled to create a single tiled image that includes all of the images for that frame. For example, the tiled image may be a single image having the image I1 from a first camera in an upper left quadrant, the image I2 from a second camera in an upper right quadrant, an image I3 from a third camera in a lower left quadrant, and an image I4 from a fourth camera in a lower right quadrant. In one embodiment, each image I1-I4 has an associated image ID, or channel ID, which may be transmitted, for example, in a vertical blanking interval for that frame. However, channel IDs are not necessary. The overall tiled image can be set to have a particular resolution (e.g., 720×480, or 525 lines compatible with the NTSC standard, or 720×576, or 625 lines compatible with a PAL standard), and the image can be digital or analog, though the resolution of the tiled image can be different if desired. Such a tiled image is shown as an example as It in FIG. 6A. However, the disclosure is not limited to only four images/four cameras, and is not limited to the orientation of tiling shown in FIG. 6A.

As a result of the tiling, a series, or stream, of frames F1It, F2It, F3It, F4It, F5It, etc., is created and output, each frame including a tiled image including images from a plurality of cameras. In one embodiment, these tiled images are output to a VCA, which may then analyze each frame in different manners. For example, because each frame includes a tiled image of images from a plurality of cameras, for certain analyses, all of the images in the tiled image can be analyzed simultaneously. For other analyses, individual of the images for each tiled image (i.e., an image from one of the cameras) can be separately analyzed, for example, using cropping techniques. As a result, the tiled frames may be analyzed as a single analysis channel, or as a plurality of analysis channels. Specific analyses are described further below in connection with FIG. 7B. A single VCA processor may be used to perform the analyses, and if the tiled images conform to a particular known video standard, such as PAL or NTSC, then a standard off-the-shelf type processor may be used. As such, the VCA processor can be used with standard video interfaces, such as ITU-R BT.656/BT.1120, High-Definition Multimedia Interface (HDMI), Video Graphics Array (VGA), Composite Video, Blanking and Sync (CVBS), etc.

As shown in FIG. 6B, the same input data as in FIG. 6A is shown, but the NVR/DVR creates multiplexed output video data in a different way than in FIG. 6A. As shown in FIG. 6B, instead of spatial multiplexing, time division multiplexing is used. As a result, the frames that are received by the NVR/DVR at the same time for different cameras are reorganized such that they are output in a different order than received. Certain frames may be selected such that frames are output from the NVR/DVR at a standard rate, such as 30 fps. The rate may be the same rate as the fps output from each camera. The rate may be a rate at which a standard off-the-shelf VCA processor is able to process frames (e.g., 30 fps, 60 fps, etc.). For example, in one embodiment, in a first frame F1 at time T1, first image data (F1I1, F1I2, F1I3, and F1I4) for each stream are received, in a second frame F2 at time T2, second image data F2I1, F2I2, F2I3, and F2I4) for each stream are received, etc. Certain image data from certain input frames may then be selected to be output to VCA processor. For example, in one embodiment, frames are output at the rate at which the VCA processor is capable of processing frames (e.g., 30 fps). In one embodiment, the frames selected may include frames F1I1, F2I2, F3I3, F4I4, F5I1, F6I2, F7I3, etc., such that, for each camera channel, the frame rate of frames analyzed by the VCA processor for that channel is approximately ¼ the frame rate for the video output from that channel.

Other frame rates can be used. For example, if a VCA processor is capable of analyzing greater numbers of frames per second (e.g., 60 fps, 120 fps), then the NVR/DVR processor can be programmed to output frames at a higher rate, which could result in a higher fps analysis for each camera channel by the VCA processor (for example, if the processing capability of the VCA processor is high enough, it could analyze all frames of all of the camera channel videos). In one embodiment, the NVR/DVR processor outputs all frames received, at a rate, for example, four times the rate of each camera channel rate, but the VCA processor processes frames at a rate at which it is capable of processing, such that it may process ¼, ½, or all of the frames it receives, depending on its processing capability.

In the embodiments described above, the VCA processor can be made aware of the organization of the frames it receives, and a single VCA processor can therefore analyze the frames for all four camera channels. The analysis of the different camera channels may occur concurrently in the above time division multiplexing example. For example, even though frames may be received consecutively and not simultaneously at the VCA processor, because of the multiplexing scheme and ascertainable order of the received frames, the video signals that correspond to the different camera channels can be analyzed concurrently.

In one embodiment, in order to process these frames, each frame output from the NVR/DVR processor or NVR/DVR on a chip device may be marked with a channel ID that corresponds to the camera channel to which the frame is associated. Alternatively, the frames can be received by the VCA processor in a particular order known to the VCA processor (e.g., a pre-determined order). As a result of either of these techniques, the VCA processor can analyze the received frames by grouping them according to the camera from which they were received, thereby forming separate analysis channels. For example, as shown in FIG. 6B, the frames labeled F1I1 and F5I1 would be grouped in the same analysis channel, since they are frames received from the same camera. The VCA processor may then analyze the received data based on the different analysis channels.

In the embodiment shown in FIG. 6C, eight input streams are input to the DVR/NVR system. These streams may correspond, for example, to eight camera channels. As shown in FIG. 6C, a hybrid multiplexing scheme is used. That is, the DVR/NVR system outputs frames using both time-division multiplexing and tiling. In one embodiment, in a first input frame F1 at time T1, image data (F1I1, F1I2, F1I3, F1I4, F1I5, F1I6, F1I7, and F1I8) for each of eight streams are received, in a second input frame F2 at time T2, image data (F2I1, F2I2, F2I3, F2I4, F2I5, F2I6, F2I7, and F2I8) for each stream are received, etc. The image data is then reorganized such that it is output as a series of tiled output frames, each including four tiles. As a result, a first tiled output frame (Frame 1) includes four images (e.g., I1, I2, I3, I4) from input frame F1, a second tiled output frame (Frame 2) includes four images (e.g., I5, I6, I7, and I8) from input frame F1, a third tiled output frame (Frame 3) includes four images (e.g., I1, I2, I3, and I4) from input frame F2, etc. Although the example of eight input streams, and "quad" tiling is described above, other numbers of input streams (e.g., 12, 16, etc.), and other tiling arrangements and/or time divisions can be used.

In the hybrid scheme described above, in one embodiment, frames are marked with a channel ID, so that the VCA processor can be made aware the camera channel associated with each tile, or quadrant, of a tiled image. As a result, the VCA can be made aware of the organization of the frames, and a single VCA processor can analyze the received tiled frames. In this embodiment, the VCA processor can include a channel decoder function to associated images associated with each channel ID with a particular analysis channel.

In a second embodiment for the hybrid scheme, channel IDs are not used. For example, in one embodiment, the host processor (420, 520) sets the tiling scheme to be used, and communicates the tiling scheme to the DVR/NVR processor (404, 504) and the VCA processor (410, 510). As such, the position of each camera channel within each tiled frame and across the multiplexed frames is known by the VCA processor, which then processes the frames and tiles accordingly.

As a result of any of the techniques described above (e.g., tiling, time division multiplexing, or a hybrid of both), the VCA processor can analyze the received frames by grouping them according to the camera from which they were received, thereby forming separate analysis channels. For example, as shown in FIG. 6B, the frames labeled F1I1 and F5I1 would be analyzed by the same analysis channel, since they are frames output by the same camera. As another example, in FIG. 6A or 6C, entire tiled frames may be analyzed by an analysis channel (e.g., each output frame in FIG. 6A, or every other output frame, such as F1It1, F2It1, etc. in FIG. 6C), or individual tiles from these tiled frames may be analyzed by a single analysis channel dedicated to that tile (e.g., one analysis channel could be only images from a particular camera channel). The VCA processor may then analyze the received data using the different analysis channels.

FIG. 7A illustrates exemplary methods for analyzing time division multiplexed video data, according to certain embodiments. The analysis may be performed, for example, by the VCA processor 410 or 510 described above. As shown in FIG. 7A, a multiplexed video signal is received by the VCA processor. The video may include a plurality of frames from different cameras, interspersed in a particular pattern. For example, the pattern may be in order first by frames, and second by cameras. As such, for each camera, a first frame including video data from that camera is received at a first time, and the second frame including a next, subsequent video data from that camera is received at a second time, but additional frames that are from other cameras are received between the first time and the second time. Third, fourth, and further frames may be received by the VCA processor in a similar manner. To analyze the data from the given camera, the VCA processor includes a channel separating module, which may include circuitry and logic programmed and configured to extract the first, second, third, fourth, etc., frames associated with that camera, which in one embodiment are frames output consecutively from the camera. Consecutive frames from a same camera may be stored in a particular memory buffer. The VCA processor may then analyze the frames together using a single analysis channel.

The pattern described above, in which the frames are received at the VCA processor, is exemplary, and the time division multiplexed frames received by the VCA processor may be organized in different ways. However, for certain embodiments, frames output consecutively from any given camera are not received consecutively by the VCA processor, but are received with other frames from other cameras interspersed between them.

FIG. 7B illustrates exemplary methods for analyzing spatially multiplexed video data, according to certain embodiments. The analysis may be performed, for example, by the VCA processor 410 or 510 described above. In one embodiment, tiled frames are created, and are processed by a single analysis channel, so that different tiles for the video streams from a plurality of cameras are analyzed simultaneously by the VCA processor. Certain analyses such as background modeling or other analyses involving pixel level operations can be analyzed in this manner. To account for the different camera images, the analysis system can have different rules associated with different tiles of a tiled video stream, based on the locations and coordinates associated with that tile. As such, analytics for the tiled video stream can be performed using one or more configuration settings associated with the different cameras. In addition, as shown in the Image 1-Image 4 analyses of FIG. 7B, different rules that instruct the VCA processor to only analyze a particular portion of the tiled video stream (e.g., a portion that corresponds to a particular camera) can be used to allow the VCA processor to analyze only a selected camera video. Certain analyses such as blob and target generation, or calibration can be analyzed in this manner. As such, different content analysis can be derived from different camera video streams even though only one analysis channel is used.

Individual tiles of the tiled video stream can also be analyzed separately by creating separate analysis channels. For example, a cropping function, implemented with hardware and/or software, could be used to remove all data in the tiled image except for a desired tile, in order to limit content analysis to a particular one or more chosen tiles of the image. As a result, content analysis need only be performed on the selected one or more tiles, and not on the entire tiled image.

Though not shown in FIG. 7B, in a system with more than four camera channels, the images associated with each camera may be marked with a channel ID (e.g., include in the vertical blanking interval for that image). As a result, the VCA processor can determine which tile of each image is from which camera, and can analyze the images appropriately. However, in certain embodiments, as described above, channel IDs are not needed when more than four camera channels are used.

In certain embodiments that use tiling, a tiled frame may conform to standard images resolution conventions. For example, if four tiles are used, a tiled image may have a resolution of 720×480, or 525 lines in an NTSC system, or 720×576, or 625 lines in a PAL system. As such, in a single quad system (e.g., four camera channels and four tiles per tiled frame) a VCA system can be set to include a default analysis where to analyze the different camera channels separately, the image is divided into four quadrants, such as upper left (UL), upper right (UR), lower left (LL), and lower right (LR), each having a size of 360×240, or 360 by 288. In this embodiment, the VCA system can assign each quadrant to a particular channel (e.g., UL=Ch1, UR=Ch2, LL=Ch3, LR=Ch4) and can analyze the camera channels separately even if they do not include channel IDs. As another example, in a multi-quad system (i.e., 8, 12, etc., cameras and four tiles per tiled frame), each image may include an associated channel ID that associates the image with a particular camera. As a result, the VCA system can use the channel ID to perform content analysis on the images that include that ID. Each tiled frame may also include one or more frame parameters, such as an associated frame size, and a frame format (such as single quad, multi-quad, etc.). The VCA system can then use the channel ID and the parameters to perform content analysis on that channel. The channel ID and parameters can also be used in a system that uses time division multiplexing with no tiling.

Each frame received by the VCA processor may be processed according to certain other VCA procedures. For example, prior to identifying and/or analyzing the tiles and tiled frames, each received frame may be de-interlaced if an interlacing type video format is used.

The system and methods described above provide the ability to perform content analysis for multiple cameras in an efficient manner, using existing off-the-shelf VCA processing equipment. For example, VCA processors having a clock frequency of 27 MHz, or 54 MHz may be used. In some embodiments (i.e., single-quad tiling), frames may be received by the VCA processor at a rate such as 30 fps. However, because not every frame needs to be used for content analysis, only one third of the frames (e.g., 10 frames per second) may be analyzed by the VCA processor. However, in other embodiments (i.e., multi-quad tiling), all, or a higher percentage (e.g., one half or two thirds) of received frames can be analyzed, or frames can be input to or received by the VCA processor at a rate (e.g., 120 fps) higher than the rate (e.g., 30 fps) at which the VCA processor processes the frames for content analysis.

Most commercially available off-the-shelf processors are single input. Generally speaking, a single input processor is cheaper than a multiple input processor and much more so compared to a custom design processor. Furthermore, the disclosed embodiments make it flexible and easy to support VCA on any input video channels because theoretically all channels are available for analysis given the processing power of the VCA processor.

In this respect, the disclosed embodiments depart from the conventional method and system of the prior art, and in so doing provide a new and cost-effective method and system for analyzing a multitude of camera feeds for security surveillance or other applications.

The foregoing is illustrative of example embodiments and is not to be construed as limiting thereof. Although a few example embodiments have been described, those skilled in the art will readily appreciate that many modifications are possible in the example embodiments without materially departing from the novel teachings and advantages of the present disclosure.

What is claimed is:

1. A system for analyzing a plurality of video signals received concurrently from a plurality of video cameras, the system comprising:
   a first processor configured to:
      receive a plurality of video signals captured from a plurality of respective video cameras, each video signal received over a respective camera channel, and
      multiplex the plurality of video signals to output a multiplexed video signal including frames from each of the captured video signals; and
   a second processor configured to:
      perform automated video content analysis on the multiplexed video signal, including performing automated video content analysis for at least two of the camera channels, the automated video content analysis including analyzing each of the at least two camera channels to determine at least one object from among the plurality of video signals.

2. The system of claim 1, wherein the multiplexing includes one or more of: time division multiplexing, and spatial multiplexing.

3. The system of claim 2, wherein the multiplexing includes spatial multiplexing, wherein individual frames of different signals of the captured video signals are combined with individual frames of other signals of the captured video signals to form tiled frames.

4. The system of claim 3, wherein the automated video content analysis includes automated video content analysis on the tiled frames.

5. The system of claim 4, wherein the automated video content analysis on the tiled frames includes simultaneous video content analysis on at least two tiles of the tiled frames.

6. The system of claim 2, wherein the multiplexing includes time division multiplexing.

7. The system of claim 1, wherein:
   the video content analysis for the at least two of the camera channels is based on one of a pre-determined order of receiving the frames of the captured video signals, and a channel identifier associated with the frames of the captured video signals.

8. A video content analysis (VCA) system, comprising:
   a module configured to:
   receive a multiplexed plurality of video signals including frames from each of a plurality of captured video signals corresponding to respective camera channels;
   perform automated video content analysis on the multiplexed plurality of video signals, including performing automated video content analysis for at least two of the camera channels, the automated video content analysis including analyzing at least a first channel of the at least two camera channels to determine at least one object from among the plurality of video signals.

9. The system of claim 8, further comprising:
a processor configured to:
receive the plurality of video signals; and
multiplex the plurality of video signals to output the multiplexed video signal.

10. The system of claim 9, wherein the module is implemented using a VCA processor.

11. The system of claim 9, further comprising a decoder that converts analog video signals that comprise the captured video signals to digital video signals, and outputs the digital video signals to the processor.

12. The system of claim 8, wherein the multiplexed plurality of video signals are tiled frames, and the module is further configured to perform automated video content analysis on the tiled frames.

13. The system of claim 12, wherein the automated video content analysis on the tiled frames includes simultaneous video content analysis on at least two tiles of the tiled frames.

14. The system of claim 8, wherein the multiplexed plurality of video signals are time division multiplexed signals.

15. The system of claim 8, wherein the module is further configured to:
perform the video content analysis based on one of a pre-determined order of receiving the frames of the captured video signals, and a channel identifier associated with the frames of the captured video signals.

16. A video content analysis (VCA) system, comprising:
a plurality of processors configured to:
receive a plurality of analog video signals from a plurality of respective cameras that capture respective videos over a plurality of respective camera channels;
convert the plurality of analog video signals to a plurality of respective digital video signals;
multiplex the plurality of digital video signals to form a multiplexed digital video signal; and
perform automated video content analysis on the multiplexed digital video signal,
wherein the automated video content analysis includes analyzing video frames from the multiplexed digital video signal to detect one or more objects in at least one of the videos.

17. The system of claim 16, further comprising:
a decoder configured to receive the plurality of analog video signals from the plurality of respective cameras that capture the respective videos over the plurality of respective camera channels, and to convert the plurality of analog video signals to the plurality of respective digital video signals; and
a multiplexer configured to multiplex the plurality of digital video signals to form the multiplexed digital video signal.

18. The system of claim 16, wherein the plurality of processors are further configured to:
analyze at least two respective videos simultaneously to detect one of more objects from the at least two respective videos.

19. The system of claim 16, wherein the multiplexed video signal is one or more of: a spatially multiplexed signal and a time division multiplexed signal.

20. The system of claim 16, wherein the automated video content analysis includes analyzing frames of the digital video signals based on one of a pre-determined order of receiving the frames of the digital video signals, and a channel identifier associated with the frames of the digital video signals.

* * * * *